ALOIS FREIHERR v. GILLERN.
BOOT AND SHOE LACE GUIDE.
APPLICATION FILED AUG. 21, 1909.

1,024,888.

Patented Apr. 30, 1912.

Witnesses
R. Goodstein
E. Schallinger

Inventor
Alois Freiherr von Gillern
by B. Singer
his Att'y

UNITED STATES PATENT OFFICE.

ALOIS FREIHERR v. GILLERN, OF VIENNA, AUSTRIA-HUNGARY.

BOOT AND SHOE LACE GUIDE.

1,024,888.      Specification of Letters Patent.      Patented Apr. 30, 1912.

Application filed August 21, 1909. Serial No. 514,000.

*To all whom it may concern:*

Be it known that I, ALOIS FREIHERR VON GILLERN, a subject of the Emperor of Austria-Hungary, residing at XIII Guldengasse 11ª, Vienna, Austria-Hungary, and an officer of the imperial royal ministry of commerce, have invented new and useful Improvements in curved Boot and Shoe Lace Guides, of which the following is a specification.

My invention relates to curved tubular lacing guides and the object of my invention is to provide lace-guides manufactured of sheet metal with attaching means which permit of securing the tubular lacing guides to the article to be fastened like the well known lacing hooks.

According to my invention the curved tube is provided with hollow shanks or attaching eyelets which protrude from the tube body and are bent to form a clamping flange. These hollow fastening projections consist of one piece of sheet metal with the tube body and are formed of a metal strip which is thereupon cut into pieces and the blanks obtained are finally bent and rolled into curved tubular lacing guides.

Figure 1:
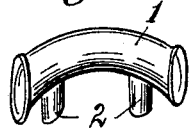
Figure 2:
Figure 3:
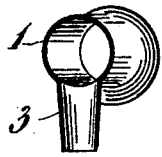
Figure 5:
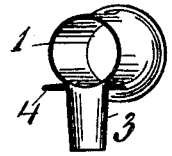
Figure 6:
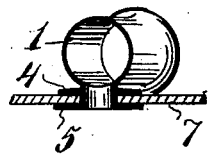
Figure 4:
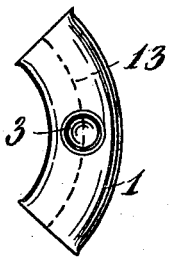
Figure 7:
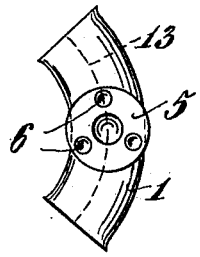
Figure 8:
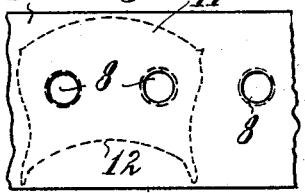
Figure 9:
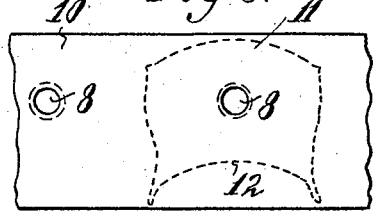

In the drawings Figures 1 and 2 show a front and plan view respectively of a tubular lace-guide provided with two hollow attaching shanks. Fig. 3 is a central cross section and Fig. 4 a bottom view of a guide having one central fastening eyelet. Fig. 5 shows a lace-guide the attaching shank of which is provided with a flange and Fig. 6 is a cross section of the same fixed to a piece of material. Fig. 7 is a view of the guide tube from below with the hollow shank bent to form a clamping flange which is provided with several hollows for preventing rotation. Figs. 8 and 9 illustrate the way of manufacturing lace-guides with hollow shanks.

The short piece of tube 1 is provided with hollow shanks 2 or eyelets which project from the wall of the tube and which, if arranged in pairs, prevent the tubular lace-guide from turning. But one central eyelet 3 (Figs. 3, 4) will keep the guide in its proper position, because it acts as a pivot for the two armed lever which the tube forms and as the tension of the lace is equal at both ends of the tube, the guide body will always come into its proper position.

The hollow shank or eyelet may be provided with a neck flange 4 (Fig. 5) which is formed by upsetting, and serves on the one hand to receive the pressure of the die of the fastening apparatus, and relieve the guide body of this pressure, and on the other hand to secure the guide body to the leather (Fig. 6).

If the lace-guide possesses one central eyelet, it is advisable to secure the guide body against turning by using with the attaching apparatus a bottom die provided with several spikes or projections. These projections form in the bent clamping flange 5 of the eyelet a number of hollows or recesses 6 (Fig. 7) which are separate from one another and may extend into the neck flange 4. In this manner projections are formed on the inner side of the flange 5 which enter the leather 7 or the like material and clamp it together so that turning is prevented.

The lace-guides are manufactured in such a manner that hollow projections 8 are produced in a metal strip 9 at suitable distances from one another by a pressing or drawing action, whereupon the blanks 10 which have to be bent and rolled are stamped out from the strip. Finally the blanks are bent into a curved trough by means of a suitable die and mandrel and the bent piece is rolled by means of two dies into a curved guide tube in which the longitudinal edges 11, 12 of the blank make joint 13 at the top or the side.

Having now described my invention what I claim as new and ask to secure by Letters Patent is:

An improved lacing guide formed of a single plate of sheet metal shaped to form an elongated tubular guide body curved in the direction of its length, said guide body having tubular fastening shanks formed from a part of the metal of the body and projecting at right angles from the axis of said body, the free margins of said body being disposed in flush edge to edge abutting relation and being arranged on that side of the body opposite to the shanks.

In testimony whereof I have set hereunto my name in the presence of two subscribing witnesses.

ALOIS FREIHERR v. GILLERN.

Witnesses:
     RICHARD KAMSNIK,
     AUGUST FUGGER.